United States Patent

[11] 3,542,172

[72] Inventor Adolph Meletti
 Philadelphia, Pennsylvania
[21] Appl. No. 746,516
[22] Filed July 22, 1968
[45] Patented Nov. 24, 1970
[73] Assignee Vacuum Cleaner Corporation of America
 Philadelphia, Pennsylvania
 a corporation of Pennsylvania

[54] ELECTRIC CORD-REEL CONSTRUCTION
 12 Claims, 19 Drawing Figs.
[52] U.S. Cl. ............................................. 191/12.2
[51] Int. Cl. ........................................... H02g 11/06
[50] Field of Search ...................................... 242/118.4,
 118.7, 77.3, 77.4, 100; 191/12.2, 12.4; 267/156

[56] References Cited
UNITED STATES PATENTS

| | | | |
|---|---|---|---|
| 2,443,701 | 6/1948 | Tamarin | 191/12.2X |
| 2,647,960 | 8/1953 | Benjamin | 191/12.4 |
| 2,948,913 | 8/1960 | Tamarin | 191/12.2X |
| 3,182,139 | 5/1965 | Meletti | 191/12.4 |

Primary Examiner—Arthur L. LaPoint
Assistant Examiner—George H. Libman
Attorney—McClure, Weiser & Millman ABSTRACT: A spring powered electric cord reel includes two plastic hub-and-flange members, one of which form an electrical chamber open at both ends and the other of which forms a spring chamber open at the outer end and closed at the inner end, the abutting edges of the hubs being integrally radially keyed to each other. A contact carrying electric core fits in the electric chamber, abutting a core-retaining flange on the outer edge of the electric chamber, keying the closed inner end of the spring chamber.

Patented Nov. 24, 1970

INVENTOR.
ADOLPH MELETTI
BY
Leonard L. Kalish
ATTORNEY

Patented Nov. 24, 1970

3,542,172

INVENTOR.
ADOLPH MELETTI
BY Leonard L. Kalish
ATTORNEY

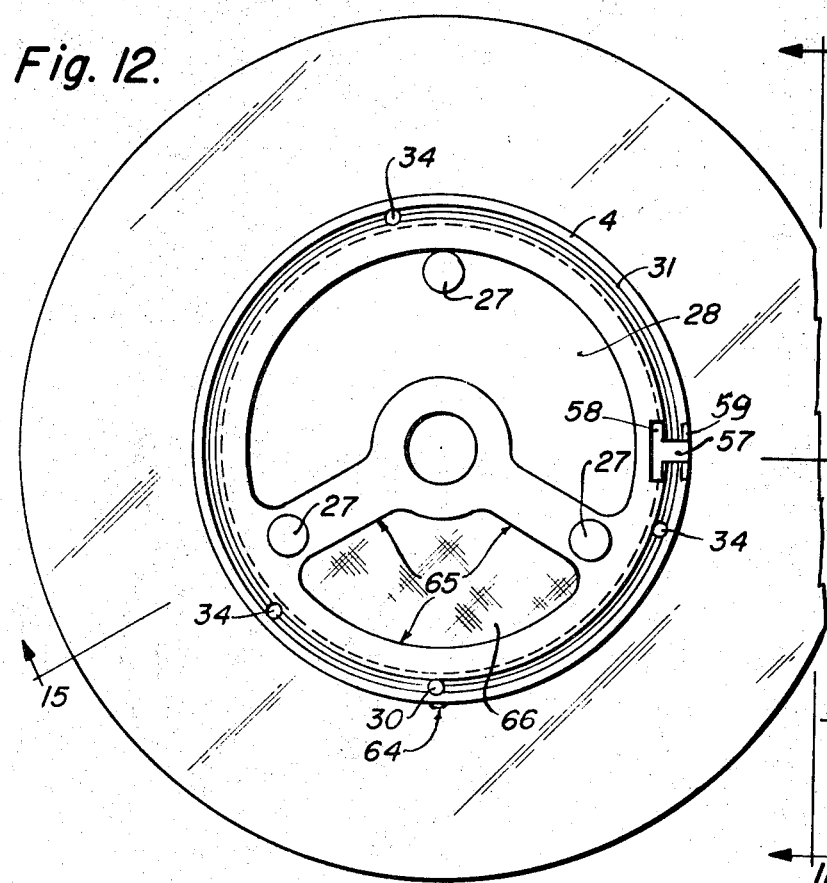
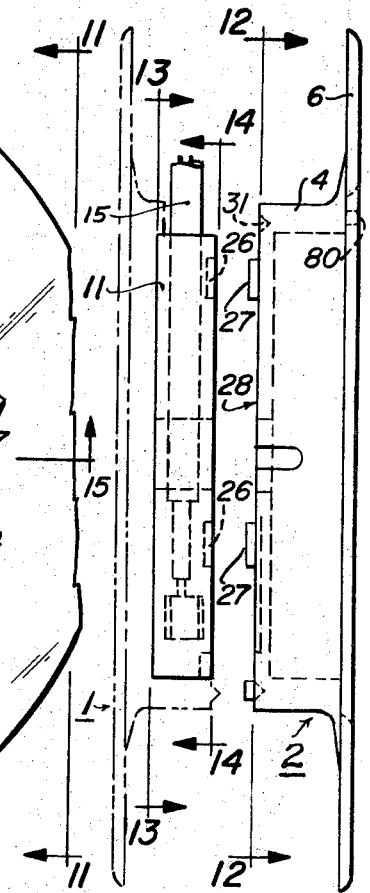
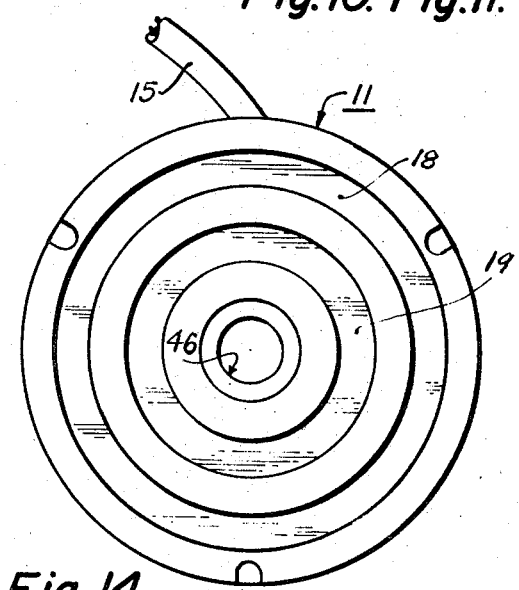

INVENTOR.
ADOLPH MELETTI
BY
Leonard L. Kalish
ATTORNEY

INVENTOR.
ADOLPH MELETTI
BY Leonard L. Kalish
ATTORNEY 3,542,172

ELECTRIC CORD-REEL CONSTRUCTION

The present invention relates to spring-retracting electrical cord reels for use with drop lights and extension lights, and for use as extension cords for electrically operated tools and appliances, and the object of the present invention is a cord reel construction with good electrical-insulating characteristics, good fire-resistance characteristics and good strength characteristics and which can be manufactured and assembled more efficiently, with fewer operations and at a cost lower than the now conventional electric cord reels.

The following is a brief description of the accompanying drawings, in which like reference characters indicate like parts; these drawings being on a scale approximately full size of the embodiment shown, excepting the Figs. whose different scale is stated hereinbelow.

Figure 1:
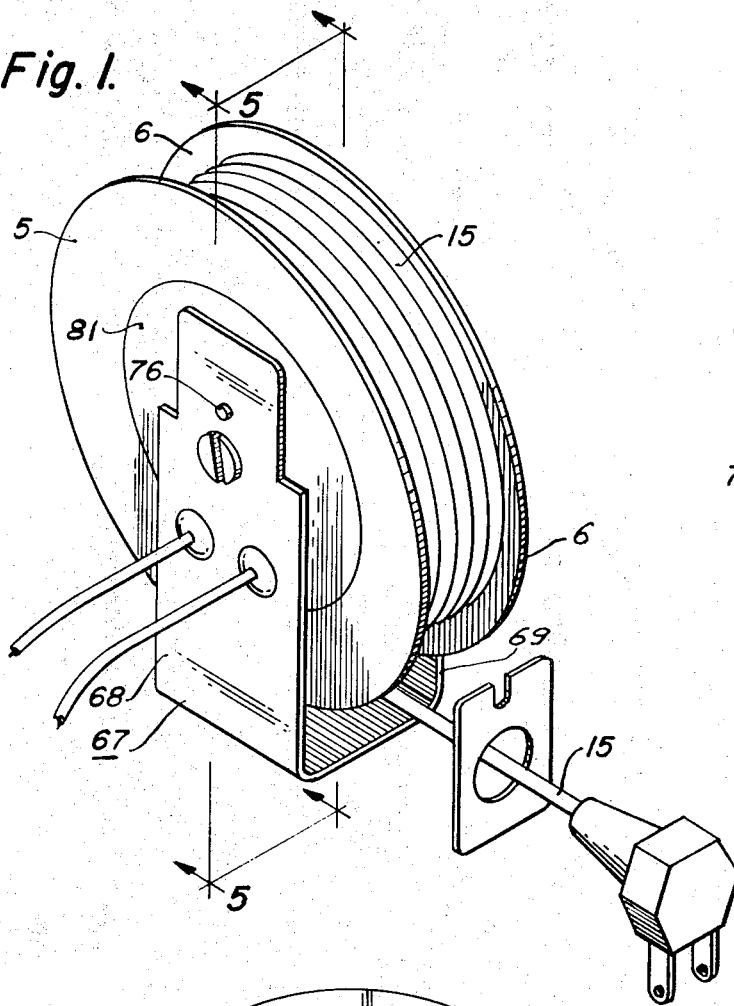
FIG. 1 is a perspective view of a cord reel representing one embodiment of the present invention.
Figure 2:
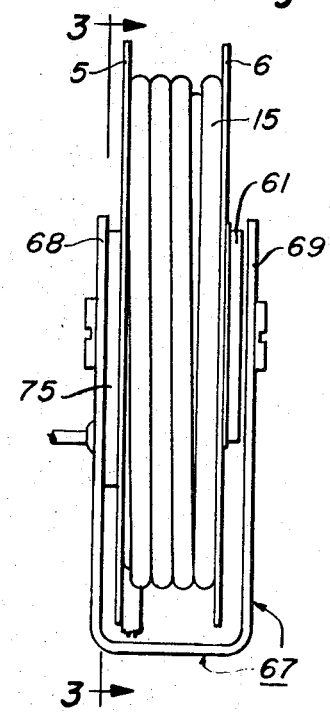
FIG. 2 represents an elevational view of the same, as viewed parallel to the cord-retaining flanges of the reel.
Figure 3:
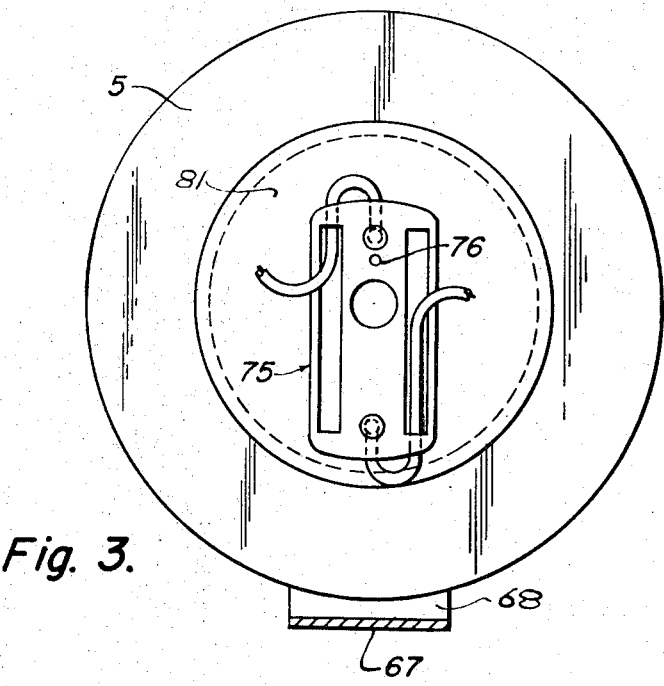
FIG. 3 represents an elevational view on line 3-3 of FIG. 2, showing the flange of the electrical-chambered hub-and-reel member showing the electrical brush block and dust-barring disc in operative juxtaposition to such hub-and-flange member.
Figure 4:
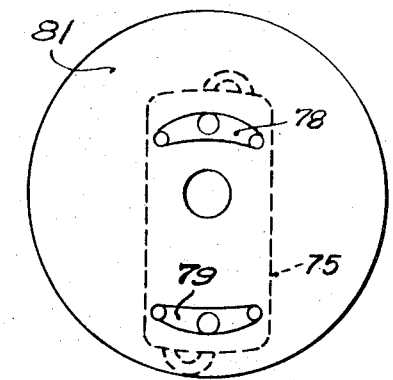
FIG. 4 represents an elevational view of the inner face of the dust-barring disc and of the electrical brushes; and showing the brush block behind the dust disc in dotted lines.
Figure 5:
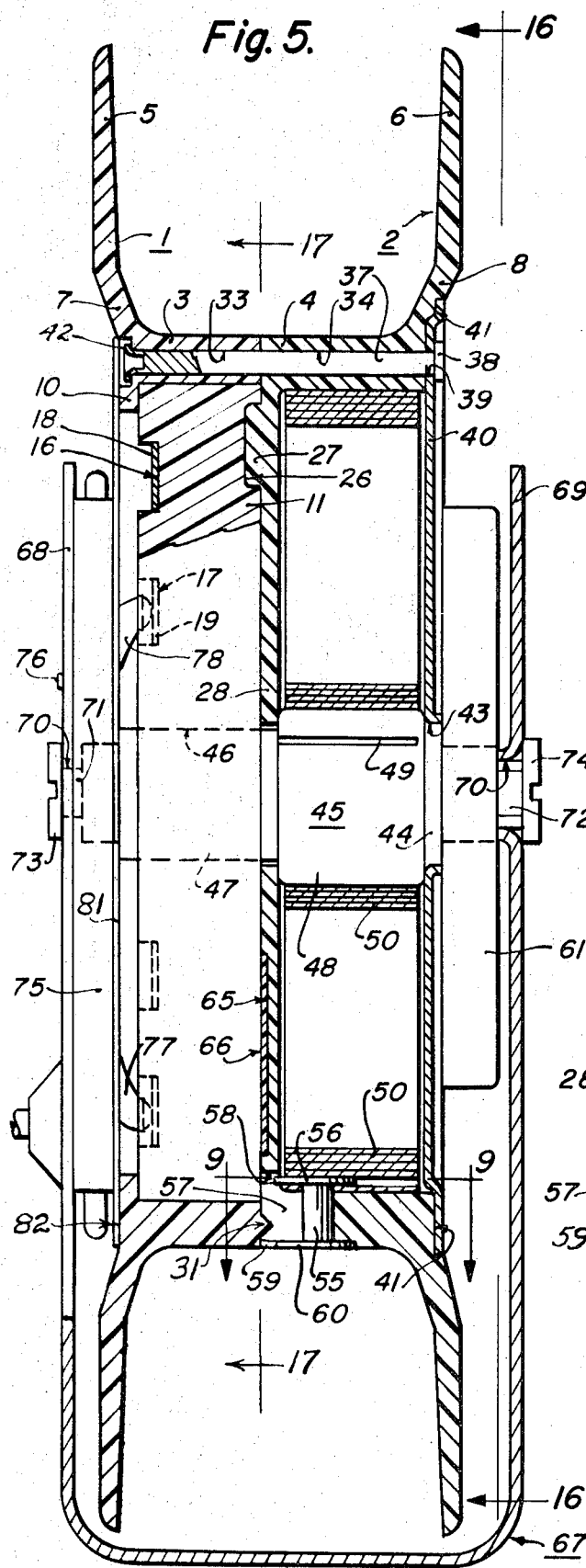
FIG. 5 represents a cross-sectional view generally on line 5-5 of FIG. 1, and more particularly on line 5-5 of FIG. 12; this view being on a scale which is approximately twice the actual size of the embodiment shown.
Figures 6, 7:
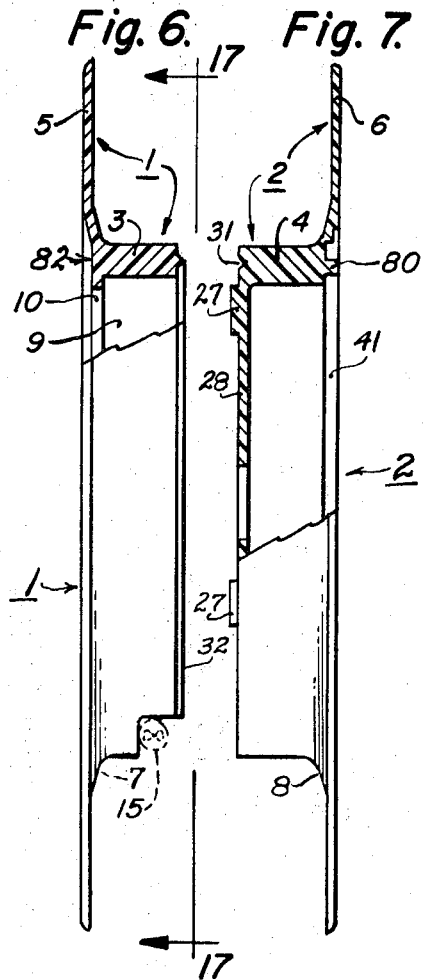
FIG. 6 represents an elevational view of the electric-chambered hub-and-flange member 1, partly in section, to show that its hub portion is open at each of its ends or faces and to show the core-retaining flange at the outer face of the electrical chamber within such hub portion thereof.

FIG. 7 represents a similar elevational view of the spring-chambered hub-and-flange member 2, showing that the spring chamber therewithin is open at its outer face and closed at its inner face, and also showing one of the three rivetlike plastic projections by which the spring-enclosing disc may be secured to the hub portion thereof (in lieu of a screw or rivet extending through both hub portions 3 and 4 as indicated in FIG. 5).

Figures 8, 9:
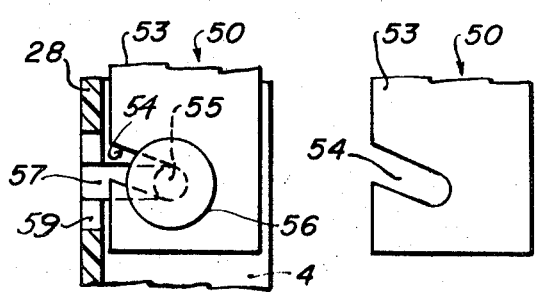

FIG. 8 represents a plan view of the outer anchor end of the cord-winding spring.

FIG. 9 represents a fragmentary cross-sectional view on line 9-9 of FIG. 5, showing the manner in which the double-headed rivetlike spring-anchorage member is inserted into the hub portion 4 of the spring-chambered hub-and-flange member 2.

FIG. 10 is an elevational view of the electrical core within the electric-chambered hub-and-flange member; the hub-and-flange member being shown in dotted lines.

FIG. 11 is an elevational view of the spring-chambered hub-and-flange member, showing the location of the spring-anchorage slot in the hub portion thereof and showing the hub-orienting dowel pin and the three electrical-orienting projections carried by said hub portion.

FIG. 12 represents a view of the inner face of the hub-and-flange member 2 shown in FIGS. 5, 7 and 11, viewed on line 12-12 of FIG. 11.

FIG. 13 represents an elevational view of the inner face of the electrical core, viewed on line 13-13 of FIG. 10.

FIG. 14 represents an elevational view of the outer face of the electrical core and of the collector rings thereof, viewed on line 14-14 of FIG. 10.

Figure 15:
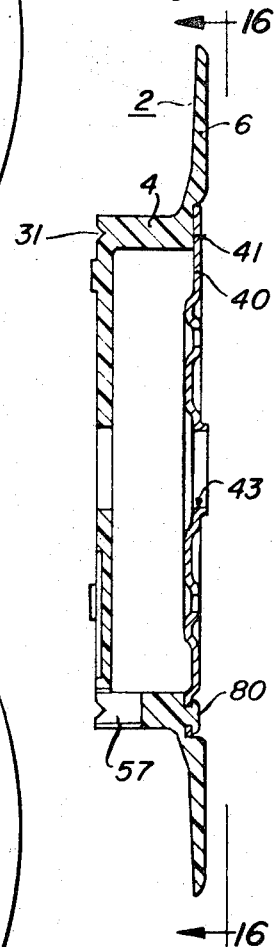

FIG. 15 represents a vertical cross-sectional view of the spring-chambered hub-and-flange member 2, viewed generally on line 15-15 of of FIG. 12, showing the spring-enclosing disc thereon and one of the integral plastic rivets securing said disc to the hub portion of said hub-and-flange member.

Figure 16:
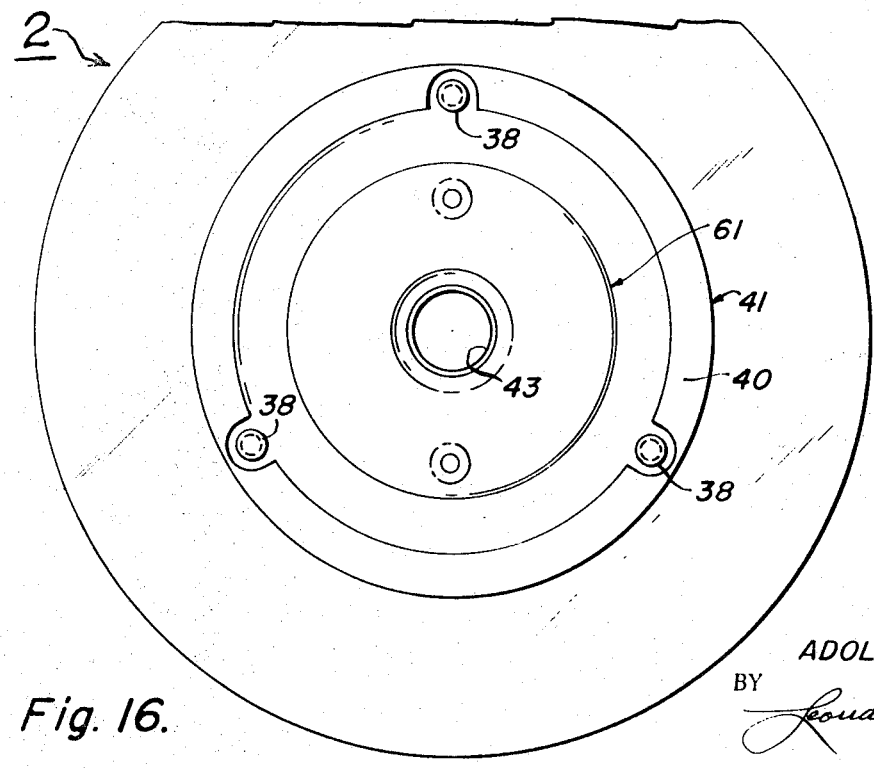

FIG. 16 represents a side elevational view of the spring-chambered hub-and-flange member 2, viewed generally on line 16-16 of FIG. 15-15 or on line 16-16 of FIG. 5.

Figure 17:
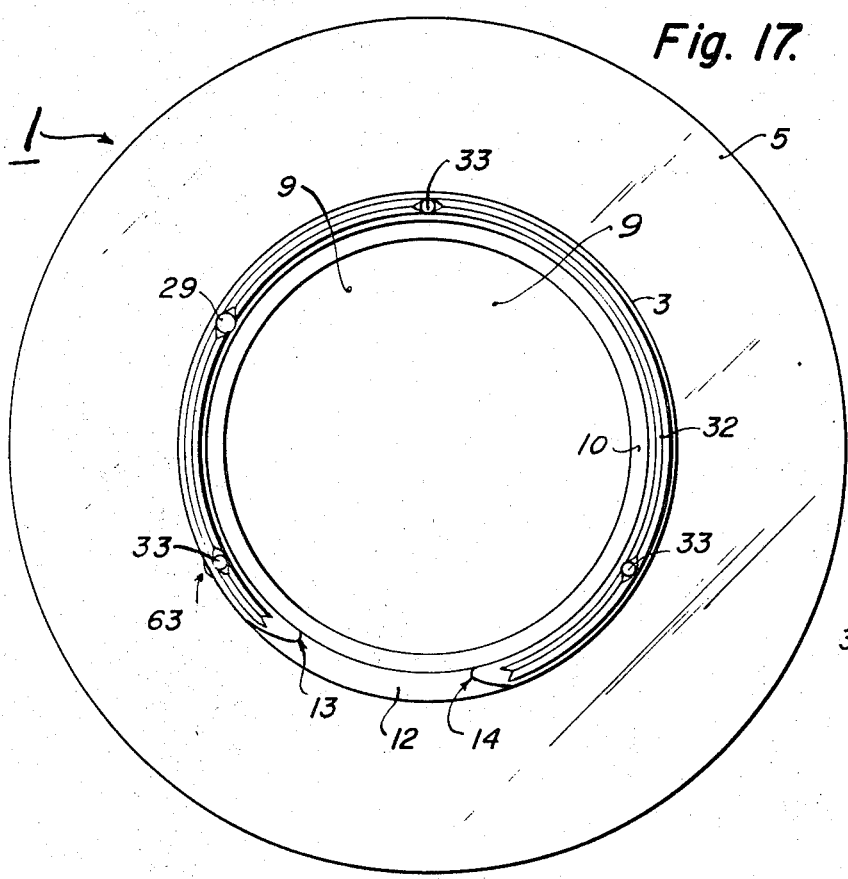

FIG. 17 represents an elevational view of the inner face of the electrical-chambered hub-and-flange member 1, viewed generally on line 17-17 of FIGS. 5 and 6.

Figure 18:
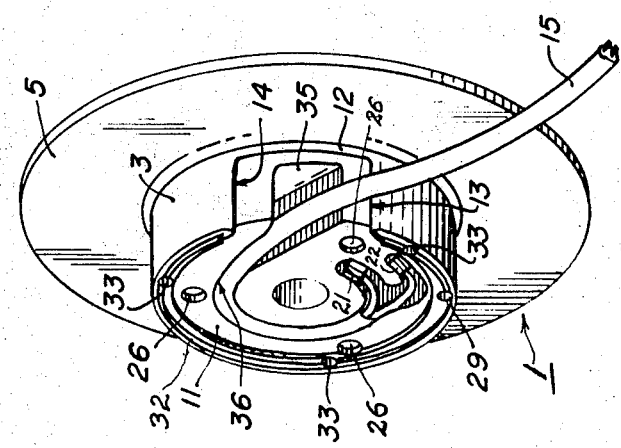
Figure 19:
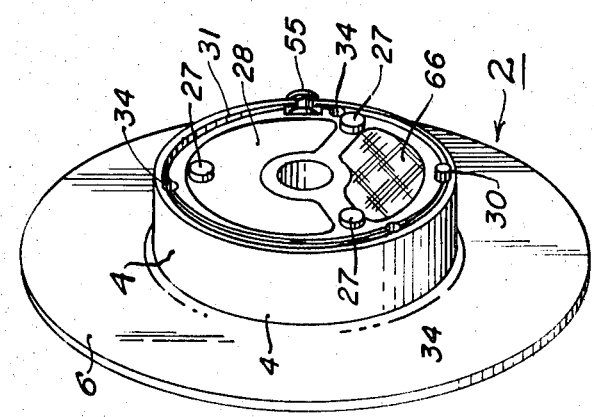

FIGS. 18 and 19 represent perspective views of the inner faces of the hub-and-flange members 1 and 2, respectively, shown with their rivet holes and other orienting elements thereof in operative alinement with each other.

The cord reel of the present invention includes a cord-storage sheave comprising two moulded plastic hub-and-flange flange members or sheave members designated generally by the number numerals 1 and 2, comprising hollow cylindrical hub portions 3 and 4, respectively, and coaxial circular disc-shaped flange portions 5 and 6, respectively, and coaxial outwardly flared connecting portions 7 and 8 between the hub portions and their respective flange portions; the hub portion, the flange and the intervening flared connecting portion of each member (1 and 2) being formed integrally with each other.

The two separate sheave members (1 and 2) abut each other generally along a plane at a right angle to their common axes, as indicated by FIG. 5. The two hub portions 3 and 4 together constitute the cord-storage hub of the sheave of the cord reel.

Each of the two hub-and-flange members (1 and 2) is formed of a form-retaining and generally nonbrittle, resilient or springy thermoplastic synthetic-resin plastic having relatively high impact strength and relatively low melting point. By reason of such resiliency, the flanges 5 and 6 can be resiliently flexed in an axial direction without danger of breakage, and will spring back to their original position shown in FIG. 5, after the removal of the flexing or impact force. The intervening connecting portions 7 and 8 and the flanges 5 and 6 are tapered in cross section so that the wall thickness thereof gradually diminishes in a radially outward direction, from the inside to the outer periphery, thereby enhancing such breakage-resistant axial resiliency.

In the present embodiment of my cord reel, the hub-and-flange members 1 and 2 are made of a generally nonflammable high-impact thermoplastic styrene having a melting point or injection-moulding temperature of the general order 205°F. (more or less). Union Carbide's No. TMDE-5161 high-impact styrene, and Dow-Corning's No. 492 high-impact styrene are examples of such plastics. It is to be understood that other resilient mouldable thermoplastic synthetic resins having relatively high impact strength may also be used.

The interior of the hub portion 3 constitutes a shallow cylindrical electric chamber 9, at whose outer end a slight inwardly extending integral annular flange 10 is provided, which serves as a core-retaining flange against which the outer periphery of the electrical core 11 abuts when inserted into the electric chamber from the inner end thereof, as shown in FIGS. 5 and 18.

The generally cylindrical hub portion 3 is interrupted at 12 to provide a cord-passage recess or gap 12 between the ends 13 and 14 of the hub portion 3, formed by such interruption. Through this gap 12 in the cylindrical hub portion 3, the electrical cord 15 passes in a somewhat tangential direction from the core 11 in the interior of the hub portion 3 to the outside thereof, where it will be wound around the hub portion 3 and the adjacent hub portion 4.

The electrical core 11 is moulded of a relatively nonresilient and relatively hard nonflammable synthetic resin as, for instance, a phenolic resin, containing a substantial proportion of filler and having a high melting point and high dielectric strength. The Hooker Chemical Company's "Durez" No. 2126 phenolic resin is an example of such resin. It is to be understood however that other similar synthetic resin materials having the aforementioned characteristics may also be used in forming the electrical core 11.

A pair of concentric shallow annular grooves 16 and 17 are provided in the outer face of the electrical core 11, and flat annular brass collector rings 18 and 19 are nested in the grooves 16 and 17, respectively, The rings 18 and 19 have electrical terminals 20 and 21, respectively, formed integrally therewith and bent inwardly therefrom and extending into and through corresponding holes 22 and 23, which extend from the respective ring grooves 18 and 19 into the terminal channels 24 and 25 at the back of the core 11, where the two wires of the cord 15 are soldered or otherwise secured to the terminals 20 and 21 as shown in FIGS. 13 and 18.

One or more shallow keying holes or dowel holes 26 are formed in the inner face of the core 11, for receiving corresponding dowellike keying projections 27 extending from the inner radial wall 28 of the juxtaposed hub portion 4 of the hub-and-flange member 2, as shown in FIGS. 5, 10, 11, 12, 13, 18 and 19.

A short blind pilot hole 29 is formed in the hub portion 3, parallel to the axis thereof, and a corresponding dowellike pilot projection 30 is provided on the inner face of the wall 28 of the hub portion 4. In assembling the hub portions 3 and 4 to each other (and so assembling the two hub-and-flange members 1 and 2 to each other) the pilot projection or pin 30 is brought into registration with a pilot hole 29 and is telescoped thereinto; such registration and telescoping serving to fixate the two hub portions 3 and 4 in predetermined angular relationship to each other.

An annular groove 31 of generally V-shaped cross section is provided in the inner end of the hub portion 4, such groove being concentric with the axis of the hub portion 4.

A complimentarily cross-sectioned annular rib 32 extends outwardly from the inner edge surface of the hub portion 3, and extends into and keyingly interfits with and nests in the groove 31, when the two hub portions (3 and 4) are assembled to each other. The rib 32 is interrupted on opposite sides of the pilot hole 29 as well as on the opposite sides of the fastener holes 33 which extend through the hub portion parallel to the axis thereof and which register with corresponding fastener holes 34 extending through the hub portion 4 when the pilot pin or projection 30 is nested in the pilot hole 29.

By means of the pilot projection 30 nesting in the pilot hole 29, whereby the two hub portions 3 and 4 are oriented to each other in predetermined angular relationship, and by means of the dowel projections 27 (carried by the wall 28 of the hub portion 4) nested in the dowel holes 26 in the core 11, the core 11 is oriented in predetermined angular relationship to the hub portion 3, so that the outwardly flared mouth 35 of the cord-nesting groove 36 in the back of the core 11 will be in registration with the cord-passage opening or gap 12 in the hub portion 3.

A rivet or screw 37, having a preformed head 38, is extended through each pair of alined through holes 33 and 34 and through the corresponding alined holes 39 in the spring-enclosing disc or plate 40 which is snugly nested in the shallow annular recess 41 in the outer face of the hub-and-flange member 2 as indicated in FIGS. 5 and 15. The other end of each rivet 37 may be hollowed by means of a short blind axial hole therein, and the resultant outer tubular end flared out to form a flared head 42 engaging the outer surface of the spring-enclosing plate 40, or the element 42 may be a nut, where the element 37 is a screw, thereby permanently or removably affixing the two hub-and-flange members (1 and 2) to each other and likewise permanently affixing the spring-enclosing disc 40 to the hub-and-flange member 2. The positions of the head 38 and riveted head (or nut) 42 may be reversed from their positions shown in FIG. 5.

The spring-enclosing disc 40 may be formed of sheet metal or of a suitably hard and relatively nonbreakable impregnated fibrous material or synthetic plastic material. The disc 40 is provided with central opening 43, at which the material of the disc is flared outwardly, thereby increasing the axial dimension or length of the hole 43. The hole 43 is journaled on the journaling portion 44 of the stationary electrically-insulating arbor 45 formed of nylon or the like, such journaling serving as one of the two bearings revolvably supporting the two hub-and-flange members 1 and 2 and the electrical core 11 on the arbor 45; the other bearing being formed by journaling the central hole 46, which extends through the core 11, on the journaling portion 47 of and of arbor 45.

The spring-winding portion 48 of the arbor 45 is provided with a slot 49 extending parallel to its axis and in the plane which is tangent to a cylinder substantially smaller than the outer diameter of the spring-mounting portion 48, so that the acute-angle lip of the slot will face in the direction opposite to that in which the this spring is wound about the arbor. The inner end of the spring 50 is bent at a corresponding acute angle to form a hooklike anchoring tab, and such anchoring tab is slipped into the slot 49, thereby to anchor the inner end of the spring to the arbor.

The outer end 53 of the spring 50 is provided with a slight inclined notch 54 extending inwardly from the inner edge of the spring, whereby the outer end 53 of the spring 50 can be hooked onto the inner end of the double-headed rivet 55, beneath the inner head 56 thereof. A slot 57 extends into the hub portion 4 from the inner face of said hub portion. The central part of the slot 57 is of a width just slightly greater than the stem or the body of the rivet 55, while the radially inward and the radially outward ends of the slot are enlarged as at 58 and 59, to accommodate the inner head 56 and the outer head 60 of the rivet 55. By this means, the spring 50 in the spring chamber within the hub portion 4, is wound up as the cord is paid out from the hub (3 and 4) between the flanges 5 and 6, by pulling the cord manually and whereby the so wound spring will rotate the two hub-and-flange members (1 and 2) in the opposite direction to rewind and retract the cord.

A dished or shallow cup like ratchet housing 61 may be secured (by rivets or crimped tabs or the like) onto the spring-enclosing disc 40. Such dished or shallow cuplike member 61 may be formed of sheet metal or other suitable material. Within the cuplike housing 61, any conventional or other reel-locking-and-releasing mechanism may be provided, for optionally locking or latching the revolable portions of the reel (including the hub-and-flange members 1 and 2) in any cord-pay-out position and for releasing such revolvable portions of the reel so as to cause the rewinding and retraction of the cord on the hub (3 and 4) under the influence of the spring 50. Such mechanism generally includes a stationary notched disc or ratchet disc stationarily affixed to the stationary arbor 45 and one, two or more pawls pivotally mounted on the revolvable disc 40 in operative juxtaposition to the ratchet disc and arranged optionally to engage a notch or tooth in the periphery of such ratchet disc or to be retracted therefrom. Such mechanisms may be either of the positive-action type in which the pawls are urged into the locking position by a spring or springs, or they may be of the gravity type in which the pawls are urged into their locking position by gravity and are kept out of their locking position by centrifugal force. For a conventional positive-action type of locking-and-releasing mechanism reference may be had to my U.S. Pat. No. 2,391,840.

Slight ribs 63 and 64 may be provided on the outer cylindrical surfaces of the hub portions 3 and 4, respectively, extending generally parallel to the axis thereof, to facilitate the rapid assembly of the two hub-and-flange members (1 and 2) to each other. These ribs are preferably placed in alinement with the pilot hole 29 and the pilot projection 30, so that the assembler can quickly turn the two hub-and-flange members (1 and 2) with respect to each other until these two ribs 63 and 64 are in line with each other, in which position the dowel pin or pilot projection 30 can be telescoped into the pilot hole 29.

The inner surface of the radial wall 28 of the hub portion 4 is provided with a shallow recess 65, in operative alinement with the channel portions or grooves 24 and 25 in the electrical core 11 and the electric terminals therein, when the dowel projections 27 (extending from the wall 28 of the hub portion 4) are inserted or nested in the dowel holes 26 in the electrical core 11. Into this recess 65 a thin sheet 66, of nonbrittle electrical insulating material of high melting point and high dielectric strength is inserted, as for instance, micarta or other electrical insulating material having a high dielectric strength and high melting point and generally nonflammable. By this means the otherwise exposed electrical terminals 22 and 23 and the bare ends of the wires soldered thereto, are enclosed by the sheet 66; and the wall 28 which is formed of relatively low melting point plastic is insulated and shielded from the otherwise bare electrical parts.

The stationary arbor 45 is stationarily supported either at one of its ends or at both ends thereof, by any suitably mounting bracket, which, in the embodiment shown, in a generally U-shaped mounting bracket designated generally by the numeral 67 and having legs 68 and 69. One or both outer ends of the arbor are reduced in diameter and provided with one or a pair of opposite flats, and the holes 70 and the legs 68 and 69 of the brackets 67 are correspondingly shaped with one or a pair of facing flats, so that when the reduced diametered ends 71 and 72 of the arbor 45 are inserted into these holes, the arbor will thereby be locked against rotation in relation to the mounting bracket 67. Headed screws 73 and 74 are threaded into axial holes in opposite ends of the arbor 45, with their heads overlapping the bracket legs 68 and 69, thereby firmly holding the bracket and the revolvable portions of the reel to each other.

The brush-mounting insulating block 75 has a dowel projection 76 thereon which extends into a corresponding hole in the bracket 67, and carries sets of brushes 77 and 78, operatively bearing against the collector rings 18 and 19, respectively; the brush block 75 having a clearance hole therein through which the arbor may freely pass.

Instead of providing the through holes 33 and 34 (in the hub portions 3 and 4) and the screws or rivets 37 therethrough, for securing the two hub-and-flange members (1 and 2) to each other and for securing the spring-enclosing disc 40 to the hub-and-flange member 2, I may adhere the meeting surfaces of the hub portions 3 and 4 to each other and form on the hub-and-flange member 2 small integral rivetlike projections 80 at the same location as those at which the through holes 34 would be, and telescope the corresponding holes 39 in the disc 40 over these projections (80) and then apply heat and pressure to the ends of these projections 80 (by means of flat-ended heated rods) until they are spread out or form heads, with the spread-out headlike portions of the projections 80 overlapping the outer surface of the disc, thereby forming rivetlike securements between the hub-and-flange member 2 and the disc 40, though by means of rivetlike portions 80 formed integrally with and of the same plastic as the hub-and-flange member 2, as shown in FIGS. 7 and 15.

Instead of using the through holes 33 and 34 and rivet 37 I may cement or fuse the two adjacent edge surfaces of the hub portions 3 and 4 to each other, including the surfaces of the groove 31 in one of the hub portions and the rib 32 projecting from the other hub portion.

Alternatively, I may secure the disc 40 to the hub-and-flange member 2 and secure the latter to the hub-and-flange member 1 by providing only the through holes 34 in the hub portion 4, and forming alined blind holes of a suitably smaller diameter in the hub portion 3, and then extending headed screws first through the holes 39 in the disc 40 and then through the holes 34 in the hub portion 4, with the ends thereof threaded into such blind holes either by causing the threaded screw to tap its way into the blind hole or by first threading blind holes with a suitable tap.

Instead of inserting the electrical core 11 into the hub portion of the preformed sheave member 1 (from the inner end of the chamber 9 towards and against the core retainer flange 10), I may mould the sheave member 1 around the core 11, by placing the preformed core 11 in an appropriate mould for the sheave member 1, and then injection moulding (or otherwise moulding) the sheave member 1 in such a mould. In so moulding the sheave member 1 around the preformed core 11, the lower melting point or moulding point of the sheave plastic permits the sheave 1 to be moulded around the core 11 without softening or otherwise adversely affecting the core 11.

An electric-protection dust-barrier or intrusion-barrier disc 81, of a thin, resilient dielectric material is operatively mounted to the brush block 75 so that the outer annular peripheral portion thereof is held in operative juxtaposition to the annular surface 82 of the sheave member 1 and so that it may bear lightly thereagainst. The brushes 78 and 79 prevent the disc 81 from rotating.

The cord reel of the present invention is durable and has high electrical insulating characteristics, and its components can be manufactured at low cost and can be assembled quickly and with the minimum number of operations and at low cost.

The electrical insulating characteristics of the electrical cord reel of the present invention are further enhanced by forming the arbor 48 of nylon or other generally unbreakable high impact resistance plastic having high dielectric strength and low coefficient of friction with other relatively hard surfaces The novel cord reel construction of my invention further conduces to economy in manufacture by making it possible to complete electrical assembly between the cord 15 and the core 11 and the collector rings 18 and 19 thereof before the core 11 is inserted into the electrical chamber 9 of the sheave member 1; thereby simplifying and reducing the cost of the manufacture of the cord reel.

My novel cord-reel construction also effects further economy in manufacture by making it possible to adhere or fuse the two hub portions 3 and 4 to each other simultaneously with the securement of the spring-closure disc 40 to the sheave member 2 shown in FIG. 15, namely, wherein the disc 40 is secured by integral plastic rivets 80. Thus, by applying a solvent or an adhesive to the meeting edge surface of the two hub portions 3 and 4, and pressing them together simultaneously with the application of three heated plungers to the three plastic rivets 80, the final securement of the two hub portions to each other and the securement of the spring-closure disc 40 can be effected simultaneously.

I claim:

1. A spring-wound electric cord reel including an arbor, a cord-storage sheave revolvably mounted on said arbor and formed of two plastic sheave members, each sheave member including a generally cylindrical hollow hub portion and an integral cord flange extending radially outwardly from the outer end of the hub portion, the hollow hub portion of one of said plastic sheave members constituting an electrical chamber and the hollow hub portion of the other plastic sheave member constituting a spring chamber, said generally cylindrical electric chamber being open at both ends thereof prior to the assembly of the two hub-and-flange members to each other and said generally cylindrical spring chamber being open at its outer end and closed at its inner end by a round disclike wall whose outer periphery is integral with the inner end of the generally cylindrical spring-chambered hub-portion, and said disclike inner wall of the spring chamber forming a closure for the inner end of the electric chamber when the two sheave members are assembled to each other, a plastic electrical core disposed within said electric chamber and carrying two outwardly facing electrical sweep-contracts, means retaining said electrical core against displacement in an axially outward direction in relation to said electrical-chambered sheave member when the latter is assembled to the other sheave member, a cord-winding spring operatively mounted within said spring chamber and having its inner end anchored to its hub portion, means fixing the angular orientation of said electric core in relation to its sheave member, a closure disc secured to the flange end of said spring-chambered sheave member and closing the outer end of the spring chamber thereof, said electrical core and said spring-closing disc having coaxial journal holes therein, said stationary arbor having journal portions in operative juxtaposition to the aforementioned journal holes and having an intermediate spring-anchorage portion and having means at least at one end thereof for stationarily securing the arbor to a stationary support, a stationary contact-carrying dielectric block in operative juxtaposition to said electrical sweep contacts carried by said electric core, and stationary electric sweep contacts carried by said dielectric block in operation position to said core-carried sweep contacts, and an anchor receiving slot in the hub portion of the spring-chambered sheave member, extending generally parallel to the axis thereof from the inner face of such hub portion to a point between such inner face and the outer end of the hub portion, a headed spring anchorage interlockingly disposed in said slot and having a head thereof extending into the spring chamber, and an notch in the outer end of the cord-winding spring, such notched spring end being hooked onto said spring anchorage between said head thereof and the inner cylindrical wall of the spring chamber.

2. An electric cord reel according to claim 1, including keying means intermediate the two sheave members for keying them to each other against radial displacement in relation to each other.

3. An electric cord reel according to claim 1, in which the electrical core has a rearwardly open cord-nesting groove whose outer end is flared outwardly, and in which electrical terminals extend from the core-carried sweep contacts into said cord-nesting groove, a cord passage in the hub portion of the electric-chambered sheave member in registration with said outwardly flared end of the cord groove of the core, and means maintaining said cord-passage in operative registration with the outwardly flared outer end of said cord-nesting groove of the core.

4. An electric cord reel according to claim 1, including complementary keying means along the juxtaposed meeting edges of the two hub portions, keying them to each other against radial displacement in relation to each other.

5. An electric cord reel according to claim 1, in which the arbor is formed of a dielectric plastic having high impact strength.

6. An electric cord reel according to claim 1, including a thin, resilient circular dielectric disc stationarily mounted to said contact-carrying dielectric member with an outer annular portion thereof in operative juxtaposition to the electric-chambered sheave member and arranged to bar the access of foreign matter to the aforementioned electric contacts carried by the electric core and by the dielectric block.

7. An electric cord reel according to claim 6, in which the arbor is formed of a dielectric plastic having high impact strength.

8. In a spring-wound electric cord reel, a pair of complementary plastic members each including a generally cylindrical hollow hub portion having a peripheral wall and a radially extending flange, one of said hub portions including a plastic radially extending inner wall, a cord-winding spring operatively mounted in said one hub portion and a dielectric core mounted in the other hub portion including collector rings exposed through the outer face of said core, an electric cord electrically connected to said rings and extending through an opening in the peripheral wall of said other hub portion, means integral with the hub interengageable between said inner wall of said one hub portion and the inner face of said dielectric core to key and retain the two hub portions in proper assembly, and means connecting said hub portions so assembled to provide a sheave member, said hub portions being substantially coextensive and providing when connected a substantially continuous sheave surface between said flanges formed of the two peripheral walls of said hub portions over which said electric cord is wound, said sheave member being adapted for revolvable mounting on a stationary arbor extending axially through said hub portions.

9. The combination of claim 8 wherein said dielectric core is substantially coextensive with the interior of said other hub portion and press fit therein.

10. The combination of claim 8 wherein said means interengageable between said inner wall of said one hub portion and the inner face of said core includes circumferentially spaced axially extending projections and recesses receiving them.

11. The combination of claim 8 and a circumferentially extending groove in said dielectric core receiving a portion of said electric cord and opening through the inner face of said dielectric core and communicative with said opening in said peripheral wall of said other hub portion.

12. The combination of claim 8 and an insulating disc covering said outer face of said core including brushes in fixed juxtaposition to said commutator rings.